United States Patent
Tendolkar et al.

(10) Patent No.: US 12,361,202 B2
(45) Date of Patent: Jul. 15, 2025

(54) METHOD AND SYSTEM OF GENERATING AN EDITABLE DOCUMENT FROM A NON-EDITABLE DOCUMENT

(71) Applicant: Microsoft Technology Licensing, LLC, Redmond, WA (US)

(72) Inventors: Gaurav Tendolkar, San Jose, CA (US); Akshay Mallipeddi, Cupertino, CA (US); Gongjie Qi, Sunnyvale, CA (US); Sumithra Bhakthavatsalam, Kirkland, WA (US); Tapan Bohra, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/990,419

(22) Filed: Nov. 18, 2022

(65) Prior Publication Data
US 2024/0169143 A1    May 23, 2024

(51) Int. Cl.
*G06F 40/166* (2020.01)
*G06F 40/103* (2020.01)
(Continued)

(52) U.S. Cl.
CPC .......... *G06F 40/166* (2020.01); *G06F 40/103* (2020.01); *G06F 40/106* (2020.01); *G06F 40/109* (2020.01); *G06V 30/412* (2022.01)

(58) Field of Classification Search
CPC .... G06F 40/166; G06F 40/109; G06F 40/103; G06F 40/106
See application file for complete search history.

(56) References Cited

U.S. PATENT DOCUMENTS

| | | | | |
|---|---|---|---|---|
| 5,208,906 A | * | 5/1993 | Morgan | ................ G06F 40/174 715/212 |
| 6,711,291 B1 | * | 3/2004 | Stubler | ................... G06T 11/60 358/453 |

(Continued)

FOREIGN PATENT DOCUMENTS

| | | | | |
|---|---|---|---|---|
| CN | 115392188 A | * | 11/2022 | |
| EP | 1331591 A2 | | 5/2008 | |
| GB | 2578988 A | * | 6/2020 | ........... G06T 11/001 |

OTHER PUBLICATIONS

D. Kumar and R. Singh, "A comparative Analysis of Feature Extraction Algorithms and Deep Learning Techniques for Detection from Natural Images," 2019 4th International Conference on Information Systems and Computer Networks (ISCON), 2019, pp. 483-487, doi:10.1109/ISCON47742.2019.9036279 (Year: 2019).*

(Continued)

*Primary Examiner* — Benjamin Smith
(74) *Attorney, Agent, or Firm* — NovoTechIP International PLLC

(57) ABSTRACT

A system and method and for generating an editable document from a non-editable document includes automatically identifying a layout for a plurality of objects in the non-editable document, where the layout includes bounding boxes of one or more of the objects, and automatically identifying a font for a text object of the plurality of objects. The method and system also includes selecting a color scheme for one or more of the plurality of objects, the color scheme corresponding to one or more color values associated with the plurality of objects the non-editable document, before automatically generating the editable document in accordance with at least one of the identified layout, identified font and selected color scheme.

19 Claims, 12 Drawing Sheets

(51) Int. Cl.
*G06F 40/106* (2020.01)
*G06F 40/109* (2020.01)
*G06V 30/412* (2022.01)

(56) References Cited

U.S. PATENT DOCUMENTS

| | | | | |
|---|---|---|---|---|
| 8,035,642 | B2* | 10/2011 | Suzuki | G06F 40/109 |
| | | | | 345/472 |
| 8,416,255 | B1* | 4/2013 | Gilra | G01J 3/526 |
| | | | | 715/810 |
| 8,806,332 | B2* | 8/2014 | Cok | G06F 40/106 |
| | | | | 715/252 |
| 9,317,777 | B2* | 4/2016 | Kaasila | G06F 40/109 |
| 9,330,437 | B2* | 5/2016 | Berglund | G06T 11/60 |
| 9,461,936 | B2* | 10/2016 | Kirillov | G06Q 10/00 |
| 9,817,804 | B2* | 11/2017 | Goldstein | G06F 16/9577 |
| 9,966,037 | B2* | 5/2018 | Malik | G09G 5/026 |
| 10,013,403 | B2* | 7/2018 | Masuko | G06F 40/169 |
| 10,068,179 | B2* | 9/2018 | O'Donovan | G06F 18/24133 |
| 10,109,092 | B1* | 10/2018 | Hitchings, Jr. | G06T 11/60 |
| 10,115,215 | B2* | 10/2018 | Matteson | G06T 11/60 |
| 10,176,430 | B2* | 1/2019 | Shankar | G06T 11/60 |
| 10,311,366 | B2* | 6/2019 | Portilla | G06F 3/04842 |
| 10,528,649 | B2* | 1/2020 | Wang | G06F 40/109 |
| 10,664,999 | B2* | 5/2020 | Gupta | G06N 3/045 |
| 10,878,298 | B2* | 12/2020 | Wang | G06F 18/2148 |
| 10,970,458 | B1 | 4/2021 | Dhanuka | |
| 11,003,831 | B2* | 5/2021 | Wang | G06V 30/245 |
| 11,080,464 | B2* | 8/2021 | Mangla | G06F 40/109 |
| 11,106,870 | B2* | 8/2021 | Jankowski | G06N 5/01 |
| 11,126,922 | B2* | 9/2021 | Shankar | G06V 30/19173 |
| 11,270,485 | B2* | 3/2022 | Sharma | G06T 11/60 |
| 11,295,495 | B2* | 4/2022 | Aggarwal | G06F 40/106 |
| 11,423,206 | B2* | 8/2022 | Kraus | G06F 40/30 |
| 11,562,153 | B1* | 1/2023 | Etwaru | G06F 40/58 |
| 11,610,054 | B1* | 3/2023 | Aggarwal | G06F 40/30 |
| 11,715,317 | B1* | 8/2023 | Grams | G06V 30/19147 |
| | | | | 382/176 |
| 11,733,785 | B2* | 8/2023 | Jain | G06F 40/109 |
| | | | | 715/256 |
| 11,756,246 | B2* | 9/2023 | O'Donovan | G06F 18/24133 |
| | | | | 345/634 |
| 2007/0074109 | A1* | 3/2007 | Nagahara | G06F 40/103 |
| | | | | 715/269 |
| 2008/0150947 | A1* | 6/2008 | Suzuki | G06F 40/109 |
| | | | | 345/472 |
| 2012/0102398 | A1* | 4/2012 | Cok | G06F 40/186 |
| | | | | 715/274 |
| 2014/0071168 | A1* | 3/2014 | Berglund | G06T 11/60 |
| | | | | 345/660 |
| 2014/0082530 | A1* | 3/2014 | De Oliveira | G06F 40/103 |
| | | | | 715/762 |
| 2015/0097842 | A1* | 4/2015 | Kaasila | G06F 18/214 |
| | | | | 345/471 |
| 2015/0128015 | A1* | 5/2015 | Masuko | G06F 40/169 |
| | | | | 715/202 |
| 2015/0154164 | A1* | 6/2015 | Goldstein | G06F 40/106 |
| | | | | 715/229 |
| 2016/0307347 | A1* | 10/2016 | Matteson | G06F 18/22 |
| 2017/0032269 | A1* | 2/2017 | Portilla | G06V 10/761 |
| 2017/0032542 | A1* | 2/2017 | Shankar | G06V 30/19173 |
| 2017/0032553 | A1* | 2/2017 | O'Donovan | G06T 11/60 |
| 2017/0032554 | A1* | 2/2017 | O'Donovan | G06F 3/0488 |
| 2018/0059919 | A1* | 3/2018 | Wan | G06F 3/04845 |
| 2018/0089151 | A1* | 3/2018 | Wang | G06V 30/226 |
| 2019/0005324 | A1* | 1/2019 | Anisimovskiy | G06V 10/762 |
| 2019/0087742 | A1* | 3/2019 | Shankar | G06F 3/04842 |
| 2019/0108203 | A1* | 4/2019 | Wang | G06F 40/109 |
| 2019/0251707 | A1* | 8/2019 | Gupta | G06T 9/002 |
| 2020/0073936 | A1* | 3/2020 | Jankowski | G06F 40/279 |
| 2020/0285916 | A1* | 9/2020 | Wang | G06F 16/90335 |
| 2020/0320165 | A1* | 10/2020 | Srinivasan | G06V 30/414 |
| 2021/0019365 | A1* | 1/2021 | Mangla | G06V 30/414 |
| 2021/0027508 | A1* | 1/2021 | Sharma | G06V 30/414 |
| 2021/0110587 | A1* | 4/2021 | Aggarwal | G06F 40/106 |
| 2021/0141464 | A1* | 5/2021 | Jain | G06F 3/0236 |
| 2022/0004698 | A1* | 1/2022 | Ikeda | G06F 40/109 |
| 2022/0138402 | A1* | 5/2022 | Kraus | G06N 3/08 |
| | | | | 715/269 |
| 2022/0215606 | A1* | 7/2022 | Radford | G06F 40/103 |
| 2022/0358280 | A1* | 11/2022 | Shirani | G06F 40/109 |
| 2023/0023386 | A1* | 1/2023 | Etwaru | G06F 3/0304 |
| 2023/0042221 | A1* | 2/2023 | Xu | G06N 3/084 |
| 2023/0070390 | A1* | 3/2023 | Weng | G06F 40/109 |
| 2023/0114742 | A1* | 4/2023 | Aggarwal | G06F 40/30 |
| | | | | 715/235 |
| 2023/0127525 | A1* | 4/2023 | Rai | G06N 3/0464 |
| | | | | 706/21 |
| 2023/0153551 | A1* | 5/2023 | Etwaru | G06F 40/263 |
| | | | | 704/2 |
| 2023/0196008 | A1* | 6/2023 | Aggarwal | G06F 40/186 |
| | | | | 715/235 |

OTHER PUBLICATIONS

Oliveira et al.; Automatic Graphic Logo Detection via Fast Region-based Convolutional Networks; Apr. 20, 2016; Proc. International Joint Conference on Neural Networks (IJCNN); pp. 1-7. (Year: 2016).*

Wang, Zhangyang, "DeepFont: Identify Your Font from An Image", Proc. of the 23.SUP.rd .ACM International Conference on Multimedia, 2015, pp. 1-9 <DOI: <10.1145/2733373.2806219> (Year: 2015).*

"Convert Between Image Formats", Retrieved From: https://imagemagick.org/script/convert.php, Retrieved on: Dec. 5, 2022, 7 Pages.

"Oleg Turbaba: "Icons and fonts both got to befriend each other"", Retrieved From: https://type.today/en/journal/turbaba#:~:text=their%20features%3A%20like-, Handgloves,-%2C%20plus%20the%20glyph, Jun. 18, 2020, 12 Pages.

Schwab, Katharine, "A Map Of The Typographic Universe, Drawn By AI", Retrieved From: https://www.fastcompany.com/90111599/a-map-of-the-typographic-universe-drawn-by-ai#:~:text=with%20the%20word%20%E2%80%9C-,handgloves,-%2C%E2%80%9D%20because%20it%20reveals, Apr. 25, 2017, 3 Pages.

International Search Report and Written Opinion received for PCT Application No. PCT/US2023/033913, Jan. 24, 2024, 11 pages.

International Preliminary Report Patentability received for PCT Application No. PCT/US2023/033913, May 30, 2025, 06 pages.

* cited by examiner

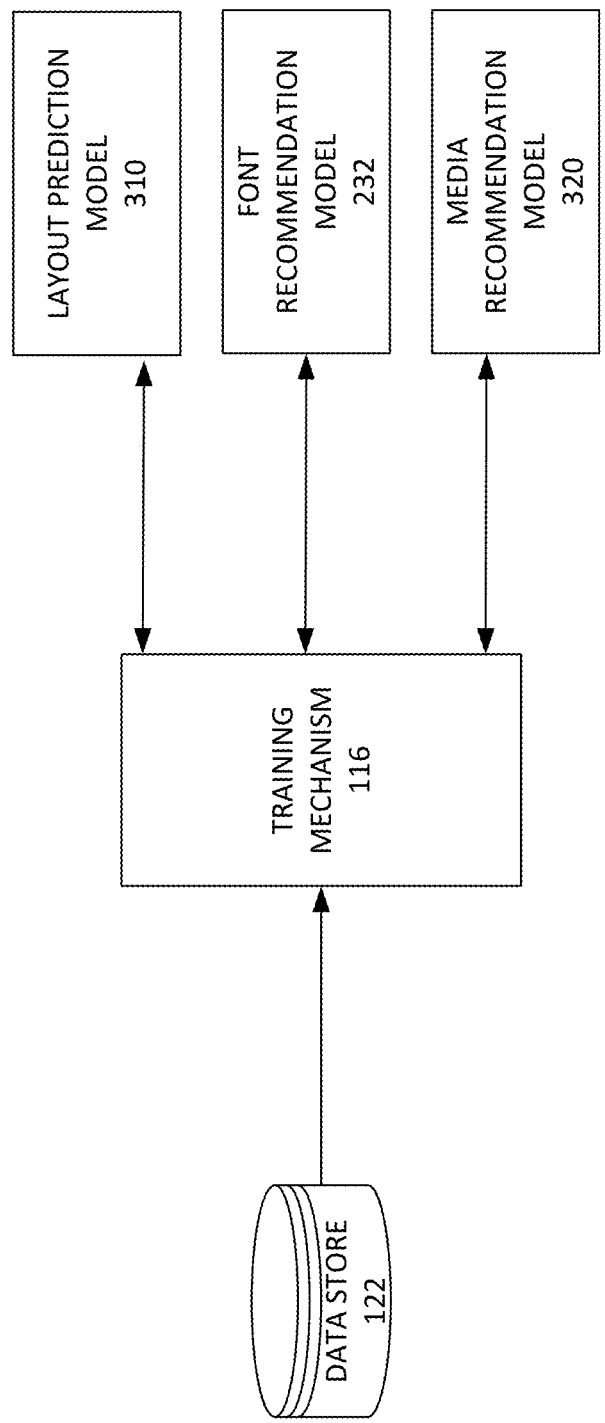

METHOD AND SYSTEM OF GENERATING AN EDITABLE DOCUMENT FROM A NON-EDITABLE DOCUMENT

BACKGROUND

It is common for users of digital devices to use a design or image as a sample, template or inspiration for creating a document. For example, users may use a sample design to create an invitation, greeting card, marketing material, brochure, design for a personalized gift and the like. The process of locating a sample document and creating a similar design based on the sample, however, is often time consuming. For example, the process requires a user to search for publicly available designs of interest, which may necessitate looking through numerous available design samples. Once a sample design has been identified, then the user would need to try to replicate the design by using an application that enables the user to create a design. Replicating the design often requires the user to speculate on the colors, type of text, and size and shape of items used. This is a time-consuming and inconvenient process. Furthermore, despite spending a lot of time and effort, the resulting design document may not look the same as the original sample.

Hence, there is a need for improved systems and methods of creating an editable document from a non-editable document.

SUMMARY

In one general aspect, the instant disclosure presents a data processing system having a processor and a memory in communication with the processor wherein the memory stores executable instructions that, when executed by the processor, cause the data processing system to perform multiple functions. The function may include accessing a non-editable document, the non-editable document including a plurality of objects; automatically identifying a layout for one or more of the plurality of objects; determining that the plurality of objects include a text object via a machine-learning model; upon determining that the plurality of objects includes a text object, identifying a font for the text object; selecting a color scheme for one or more of the plurality of objects, the color scheme corresponding to one or more color values associated with the plurality of objects; and automatically generating an editable document in accordance with at least one of the identified layout, identified font and selected color scheme.

In yet another general aspect, the instant disclosure presents a method for generating an editable document from a non-editable document. In some implementations, the method includes receiving the non-editable document via a network, the non-editable document including a plurality of objects; automatically identifying a layout for one or more of the plurality of objects; determining that the plurality of objects include a text object via a machine-learning model; upon determining that the plurality of objects includes a text object, identifying a font for the text object; determining that the plurality of objects include a media object; upon determining that the plurality of objects include a media object, searching for and identifying a media object in a library of media objects, wherein the identified media object is similar to the media object; and automatically generating an editable document in accordance with at least one of the identified layout, identified font and identified media object.

In a further general aspect, the instant application describes a non-transitory computer readable medium on which are stored instructions that when executed cause a programmable device to perform function of receiving a non-editable document via a network, the non-editable document including a plurality of objects; automatically identifying a layout for one or more of the plurality of objects; determining that the plurality of objects include a text object via a machine-learning model; upon determining that the plurality of objects includes a text object, identifying a font for the text object; selecting a color scheme for one or more of the plurality of objects, the color scheme corresponding to one or more color values associated with the plurality of objects; and automatically generating an editable document in accordance with at least one of the identified layout, identified font and selected color scheme.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 depicts an example of some elements involved in generating an editable document from a non-editable document.

DETAILED DESCRIPTION

Figure 1:
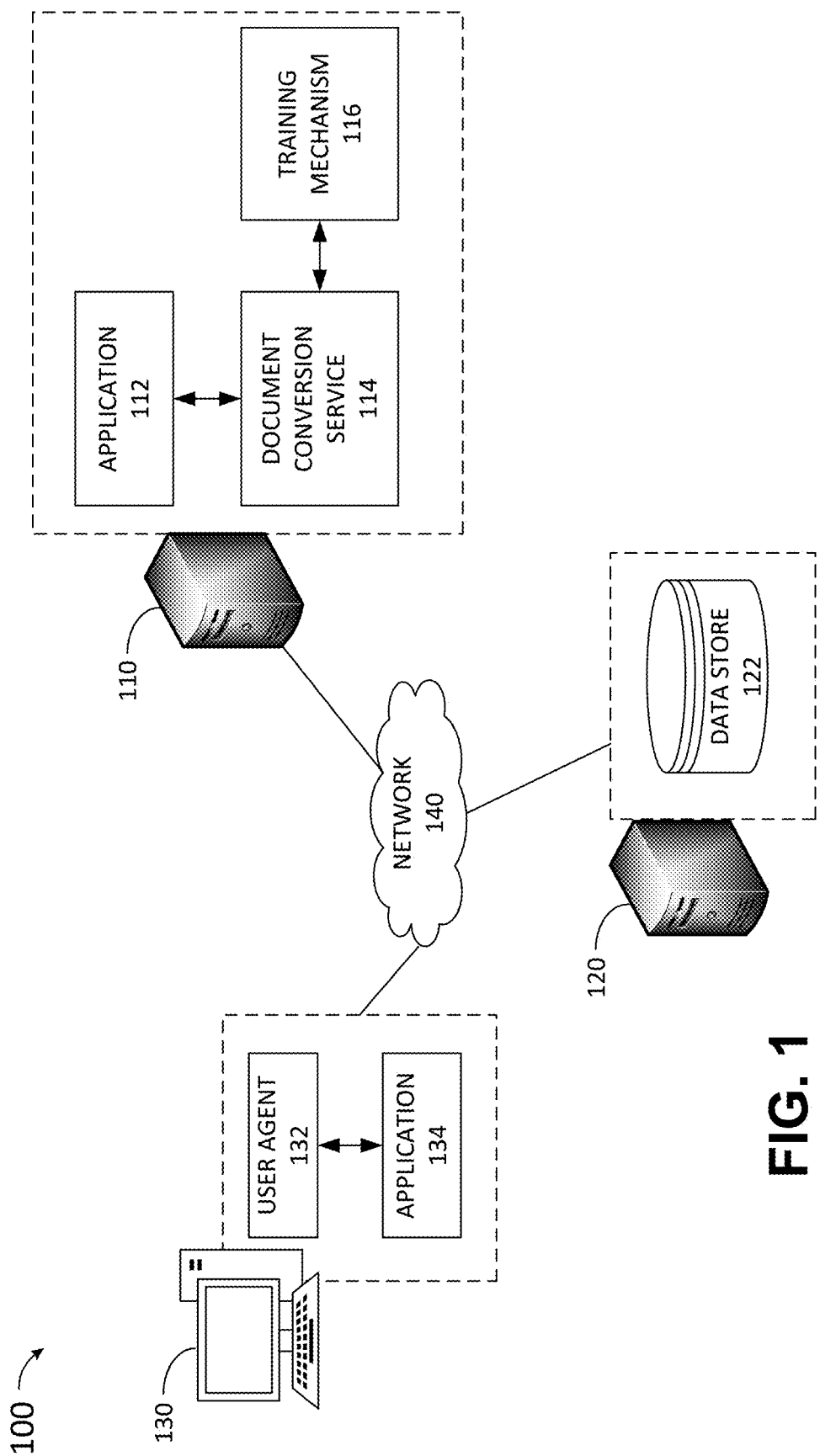
FIG. 1 depicts an example system upon which aspects of this disclosure may be implemented.

Users of design applications often find sample design documents that are interested in replicating for their own designs. However, most available design documents are in non-editable formats. To replicate such a design document, the user would need to speculate on the type of font and size of font used, search for and locate any images used in the design document, identify the color scheme and recreate the objects in the document. These tasks require a significant amount time and experience. Thus, there exists a technical problem of lack of mechanisms for efficiently creating an editable document that replicates a non-editable document.

Furthermore, automatically creating an editable version of a non-editable document is a complex undertaking, as creating an editable document from a non-editable would require converting texts, objects, backgrounds, images, and the like to editable elements. Each of these conversions requires algorithms for detecting features of the elements in the non-editable document, identifying similar features in the format in which the document is being converted to and incorporating the detected features and elements into an editable document that replicates the non-editable document. While some mechanisms exists for converting some non-editable documents to editable documents (e.g., converting PDFs to Word documents), the current mechanisms do not take into account and accurately convert elements such as fonts, color schemes, and layouts. As such, there are no existing mechanisms that are able to automatically replicate text style, color scheme, objects and the like from a non-editable document to an editable document. Thus, there exists a technical problem of lack of mechanisms for automatically detecting features of a non-editable document to enable automatic conversion of a non-editable document to an editable document.

To address these technical problems and more, in an example, this description provides technical solutions for automatically generating an editable document from a non-editable document. This may be achieved by utilizing a pipeline that includes modules for similar font recommendation, media and color palette recommendation, and layout prediction. The pipeline receives a non-editable document as an input and provides the document to the multiple modules in the pipeline to identify one or more fonts for any text in the document, and identify media, color settings and layout for the elements in the document. The identified fonts, media, color settings and layout will be used to generate an editable document that replicates the non-editable document. The similar font recommendation module identifies a similar font type from among a library of fonts for an input font image. The media and color palette recommendation modules include the ability for image-to-image search and color palette extraction. The layout prediction provides image detection and identification of bounding boxes for text. The pipeline may also include an optical character recognition (OCR) module for converting images of text to text characters. Once the various modules recognize text, identify a similar font to the one in the input document, determine color settings for the document and identify bounding boxes for texts and other objects, the pipeline creates an editable document using the extracted and recommended information. The editable document may then be provided for post-processing that includes image cropping, scaling, and font size estimation, among others. In some implementations, the technical solution also offers automatic resizing of the editable document by preserving resizing the document in a manner that preserves aspect ratio of various elements in the document.

The technical solution described herein addresses the technical problem of inability of current mechanisms to automatically generate an editable document that accurately replicates a non-editable document. The technical solution allows a user to quickly and efficiently convert a non-editable document to an editable document, where the generated editable document includes editable text, color settings, and objects. The technical effects at least include (1) improving the efficiency and accuracy of generating a document based on a sample design, where the sample design is a non-editable document; (2) automating the process of converting a non-editable document to an editable document; and (3) automatically identifying features such fonts, colors, and object layouts in a non-editable document.

As will be understood by persons of skill in the art upon reading this disclosure, benefits and advantages provided by such implementations can include, but are not limited to, a technical solution to the technical problems of lack of mechanisms for efficient and user-friendly creation of designs based on sample designs. Technical solutions and implementations provided herein offer a mechanism for automatically converting a non-editable document to an editable document that replicates the non-editable document in an efficient and accurate manner. The benefits made available by these technology-based solutions provide a user-friendly mechanism for generating new designs and documents.

As used herein, the terms "non-editable document," refers to an electronic document that cannot be edited by word processing, presentation or design creation applications. Examples of non-editable documents include images (e.g., jpeg, GIF, PNG, etc.) and PDF documents. While an image may be inserted into a word processing, presentation application (e.g., PowerPoint), or design application (e.g., Microsoft Designer), the content of the image cannot be edited by these applications. Thus, the image is referred to as a non-editable document. The term "editable document" as used herein refers to a type of electronic document that can be edited by word processing, presentation and/or design creation applications.

FIG. 1 illustrates an example system 100, upon which aspects of this disclosure may be implemented. The system 100 includes a server 110, which itself includes an application 112, a document conversion service 114, and a training mechanism 116. While shown as one server, the server 110 may represent a plurality of servers that work together to deliver the functions and services provided by each service or application included in the server 110. The server 110 may also operate as a cloud-based server for offering document conversion services in one or more applications such as application 112 and/or application 134. The server 110 may also operate as a shared resource server located at an enterprise accessible by various computer client devices such as a client device 130.

The server 110 includes and/or executes a document conversion service 114, which may receive and process a request for converting a non-editable document to an editable document from an application such as the application 112 or 134. The request may be an explicit request submitted by a user via a user interface (UI) associated with the application 112 or 134. For example, the user may have found and downloaded an image that they are interested in replicating and may submit a request for converting the image to an editable format. Alternatively, the request may be transmitted automatically via the application 112 or 134 to provide automatic document conversion for a user. For example, a user may select a sample design offered by the application 112 or 134 and the design may be in a non-editable format. Thus, the application may submit a request to convert the document to an editable version that can be presented to the user. In either scenario, the request includes a copy of the non-editable document. Once the request is received, the document conversion service 114 examines the document and extract various features to generate an editable document that replicates the input document. This is achieved by utilizing multiple modules some of which include one or more ML models that perform OCR, font recommendation, image to image searches and more. The internal structure of and data flow between the various elements of the document conversion service 114 is discussed in greater detail with respect to FIG. 2.

One or more ML models implemented by the document conversion service 114 are trained by the training mechanism 116. The training mechanism 116 may use training data sets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. In other implementations, the training mechanism 116 uses unlabeled training data. The initial training may be performed in an offline stage. Additionally, and/or alternatively, the one or more ML models may be trained using batch learning.

As a general matter, the methods and systems described herein may include, or otherwise make use of one or more ML model to perform NLP, vectorize different types of data, analyze content and/or locate search results. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in images to identify similarities between fonts. Such training may be made following the accumulation, review, and/or analysis of data. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models is selected based on factors such as, but not limited to, accuracy, computational efficiency, and/or power efficiency. In some implementations, a single trained ML model is produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The system 100 includes a server 120 which may be connected to or include the data store 122 which may function as a repository in which databases relating to training models, font libraries, color palettes, image libraries and/or vectorized representations of fonts and/or images may be stored. Although shown as a single data store, the data store 122 is representative of multiple storage devices and data stores which may be accessible by one or more of the document conversion service 114, training mechanism 116, and application 112.

The client device 130 is connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., application 112 or application 134). Examples of suitable client devices 130 include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail with respect to FIGS. 8 and 9.

The client device 130 includes a local application 134. The application 134 is a computer program executed on the client device that configures the device to be responsive to user input to allow a user to interactively create, edit, and/or review a document. The application 134 may also enable the user to interactively submit a request for conversion of a document or resizing a document and receive a converted document, font recommendations, and/or a resized document. Examples of suitable applications include, but are not limited to, a word processing application, a presentation application, and a design application.

In some examples, the application used to submit a request for document conversion is executed on the server 110 (e.g., application 112) and provided via an online service. In some implementations, web applications communicate via the network 140 with a user agent 132, such as a browser, executing on the client device 130. The user agent 132 may provide a UI that allows the user to interact with the application 112. User and document data from the application 134 or application 112 is provided via the network 140 to the document conversion service 114 for use in converting non-editable documents to editable documents.

In some implementations, the client device 130 includes a local document conversion engine for performing offline document conversion. The local content retrieval engine may be a lite (e.g., simplified) version of the document conversion service 114 that enables conversion of a non-editable document to an editable document locally. In an example, the local document conversion engine receives a non-editable document as an input, utilizes light versions of ML models for font identification and/or OCR, and utilizes local modules for image-to-image searching and/or color extraction and layout determination to extract various features from the input document and generate an editable document based on those features.

Figure 2:
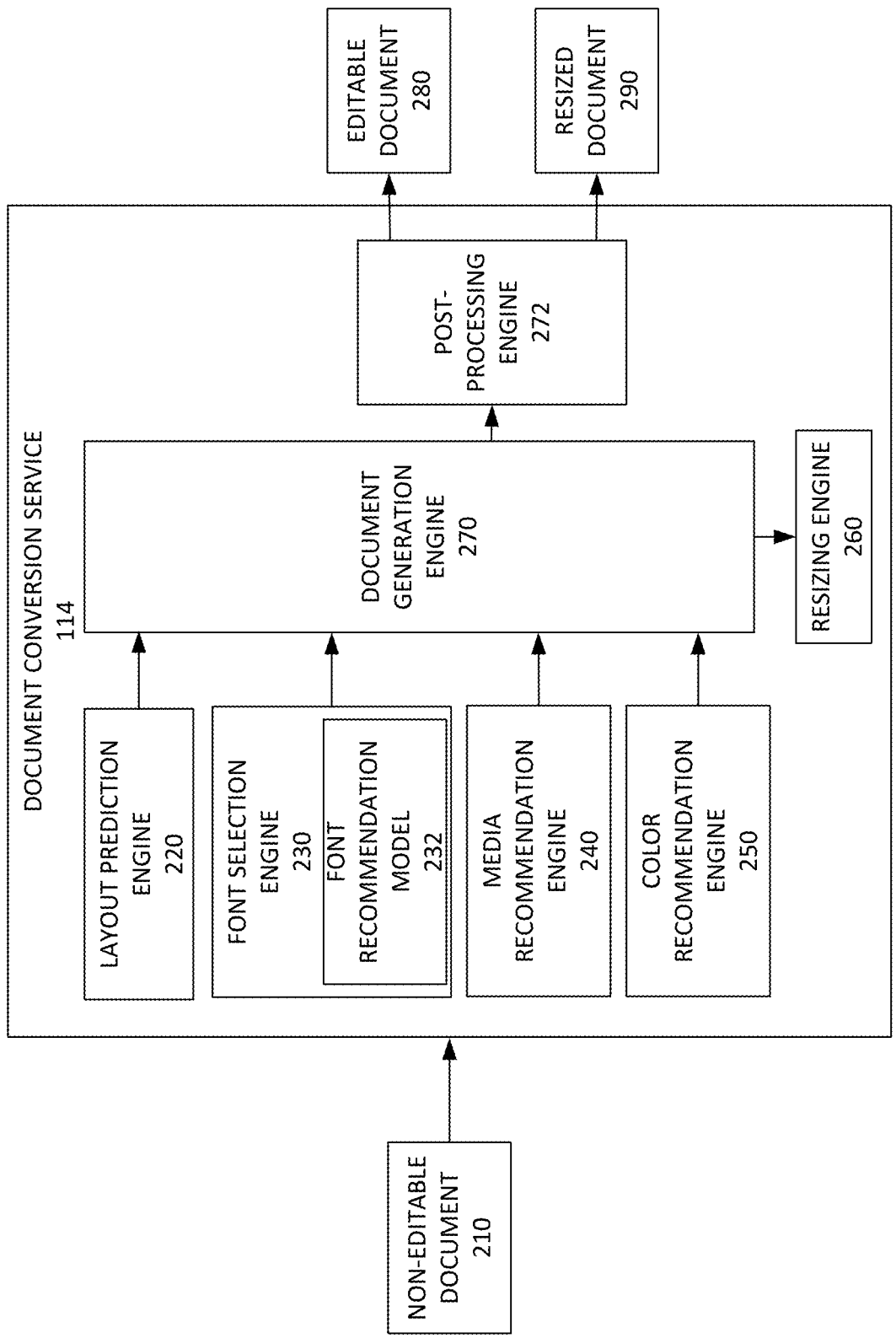
FIG. 2 depicts an example of some elements involved in converting a non-editable document to an editable document.

FIG. 2 depicts an example of some of the elements involved in converting a non-editable document to an editable document. Once a request for converting a non-editable document is received, the request is submitted to the document conversion service 114. The request may include the non-editable document 210 or the document conversion service 114 may retrieve the non-editable document 210 upon receiving the request. Once received, the document conversion service 114 utilizes a layout prediction engine 220, font selection engine 230, media recommendation engine 240, color recommendation engine 250 and/or resizing engine 260 to process the non-editable document, and extract information that can be used by a document generation engine 270 to generate an editable version of the non-editable document 210.

In some implementations, the non-editable document 210 is first provided to the layout prediction engine 220. The layout prediction engine 220 examines the non-editable document 210 to detect various objects in the non-editable document 210. To achieve this, the layout prediction engine 220 may make use of one or more object detection ML models. The object detection ML models are trained neural network models for detecting image and text bounding boxes in a given image document. Thus, the models are trained to detect whether an object in a given document is a text segment. Once text segments are identified, the models are trained to detect the bounding boxes that surround each separate text segment. Furthermore, the models are trained for detect individual objects within a given design document. For example, if the document includes two separate text segments, a picture of a dog and icon for a cat, the model is trained to identify each of the text segments, the dog picture and the icon for the cat, and determine the bounding boxes that surround each of those objects. The models may also be trained to identify a bounding box for a background object in the document. The size of the bounding box for the background may be the same as the size of the document itself. Thus, a given input document can be parsed into various elements that make up the document. As such, the layout prediction engine 220 receives the non-editable document 210 as an input and provides a list of objects identified in the document and along with coordinates of the bounding boxes surrounding each object as an output. The models used by the layout prediction engine 220 may be trained by providing a labeled training set of images that include texts and other objects.

When one or more text segments are identified in the non-editable document, information about the identified text segments is provided to the font selection engine 230 to selecting a font for each text segment. The information provided to the font selection engine 230 includes a list of the identified text segments along with coordinates of their bounding boxes. The font selection engine 230 then uses the coordinate information to generate input images of each of the identified text segments. This may be done by cropping the non-editable document along the bounding box for each text segment to generate an image of just the text segment. Each generated image is then provided to a font recommendation model 232 for font identification and recommendation. The font recommendation model 232 is a model trained for processing an input text image, comparing the image to a library of available fonts and recommending a font from the library that most closely matches the font of the input text image for selection. The recommended font is then provided to the document generation engine 270 for use in generating the editable document 280. The details of training and utilizing the font recommendation model 232 are discussed in greater detail with respect to FIGS. 4A-4B.

In some implementations, when one or more image portions are identified in the non-editable document, information about the identified image portions is provided to the media recommendation engine 240. The information may include is involves a list of the identified media portions (e.g., images, icons, illustrations, etc.) along with coordinates of the bounding boxes surrounding each media portion. The media recommendation engine 240 then uses the coordinate information to generate input images of each of the identified media portions. This may be done by cropping the non-editable document along the bounding box for each media portion to generate an image of just that media portion. Each generated image is then provided to media (e.g., an image-to-image) searching engine for identification of similar media (e.g., similar images). This may be used when one or more media portions in the non-editable documents cannot be used in the editable document for various reasons. The reasons may include low quality (e.g., low resolution, etc.), lack of permissions for use and the like. In such cases, the media recommendation engine 240 provides the media portion to known image-to-image searching engines to identify and recommend usable media for replacing the media portion. The image-to-image search engine may utilize one or more ML models trained in searching for and identifying media (e.g., images) that are similar to an input image. The identified images are then provided to the document generation engine 270 for use in generating the editable document 280.

In addition to the font selection engine 230 and the media recommendation engine 240, the objects identified by the layout prediction engine 220 are also be provided as input to the color recommendation engine 250. Depending on the type of object, the color recommendation engine 250 then extracts color values from the pixel values that correspond to a given object in the input document. In an example, color is extracted for pixels that correspond to a background of the document. Moreover, color is extracted for background and foreground of text segments such that for each segment the background color and font color can be identified. This may be achieved by using known mechanism for extracting color from pixel values. The color recommendation engine 250 then compares the extracted color values (e.g., color statistics) to available colors in the color palate offered by the application to which the non-editable document is converted (e.g., color palate offered by PowerPoint, when the non-editable document is being converted to a PowerPoint document). A color that closely matches the extracted color pixel values is then identified and recommended by the color recommendation engine 250 for various objects (e.g., background, text boxes, fonts, etc.) in the input image. The recommended colors are transmitted from the color recommendation engine 250 to the document generation engine 270 for use in generating the editable document 280.

The document generation engine 270 utilizes the objects identified by the layout prediction engine 220 to create an outline of various objects (e.g., text boxes, image boxes, etc.) in an editable document 280. The document generation engine 270 then uses the recommended image portions or original image portions from the non-editable document to fill the image objects of the editable document. Furthermore, the text segments are inserted into the text boxes. To identify the text, the document conversion service 114 may make use of an external OCR or include an OCR engine that recognizes text characters. The recognized characters are then inserted and formatted with the font recommended by the font selection engine 230 and the color recommended by the color recommendation engine 250. Moreover, background portion and other objects in the document are colored in accordance with the colors recommended by the color recommendation engine. In this manner, the document generation engine 270 utilizes the various modules in the document conversion service to generate the editable document 280 such that it replicates the non-editable document 210.

In some implementations, the document generated by the document generation engine 270 requires post-processing before it can be used. In these instances, the generated document is transmitted to a post-processing engine 272 for performing one or more post-processing operations. Post-processing may include image cropping, scaling, and/or font size estimation. Image cropping may involve cropping an image object included in the document to fit properly within a given parameter. This may be necessitated when the size of one or more elements of the output document is different from the corresponding sizes of the input document. Scaling may involve scaling one or more objects such as text boxes to correspond correctly with the other elements of the output document. Font size estimation, on the other hand, involves calculating a font size that accurately aligns the text of each text segment within the confines of the text box in which it is displayed. For example, when the font size of a text portion is too small, the text is likely too far from the bounding box surrounding the text. This indicates that the text is too small, thus suggesting a need for increasing the font size to better fit the text box. After the generated document undergoes post-processing, it is provided as an output editable document 280. The output editable document 280 may be transmitted back to the application from which the request for conversion was received for display to the user.

In some implementations, the document conversion service includes a resizing engine 260. The resizing engine 260 may receive the editable document 280 from the document generation engine 270 and resize the editable document in a manner that preserves the aspect ratios among various elements. For example, the request for conversion of the non-editable document may specify the size requirements for the editable document and the size requirements may necessitate resizing the generated editable document after it has been created by the document generation engine 270. In alternative implementations, an editable document is received as an input of the document conversion service 114 with a request for resizing the editable document to a specific size. In some implementations, the resizing engine 260 is external to the document conversion service 114. For example, the resizing engine 260 is offered as a separate service by a design application. In such implementations, the resizing engine 260 receives the editable document as input and provides a resized editable document 290 as an output. The operational details of the resizing engine 260 are discussed in greater detail with respect to FIGS. 6A-6D.

FIG. 3 depicts how one or more ML models used by the document conversion 114 are trained by using the training mechanism 116. The training mechanism 116 may use labeled training data sets stored in the data store 122 to provide initial training to the layout prediction model 310 (used by the layout prediction engine), font recommendation model 232 and media recommendation model 320 (used by the media recommendation engine 240). In some implementations, one or more pretrained models are used for each of the layout prediction model 310, font recommendation model 232 and media recommendation model 320.

In some implementations, to provide ongoing training, the training mechanism 116 may use training data sets received from each of the ML models. Furthermore, data may be provided from the training mechanism 116 to the data store 122 to update one or more of the training datasets in order to provide updated and ongoing training. Additionally, the training mechanism 116 may receive training data such as knowledge from other pre-trained mechanisms. The models may be initially trained in an offline phase. Once the models are trained, ongoing training or adding of new training data may be done periodically to update the models.

Figure 4A:
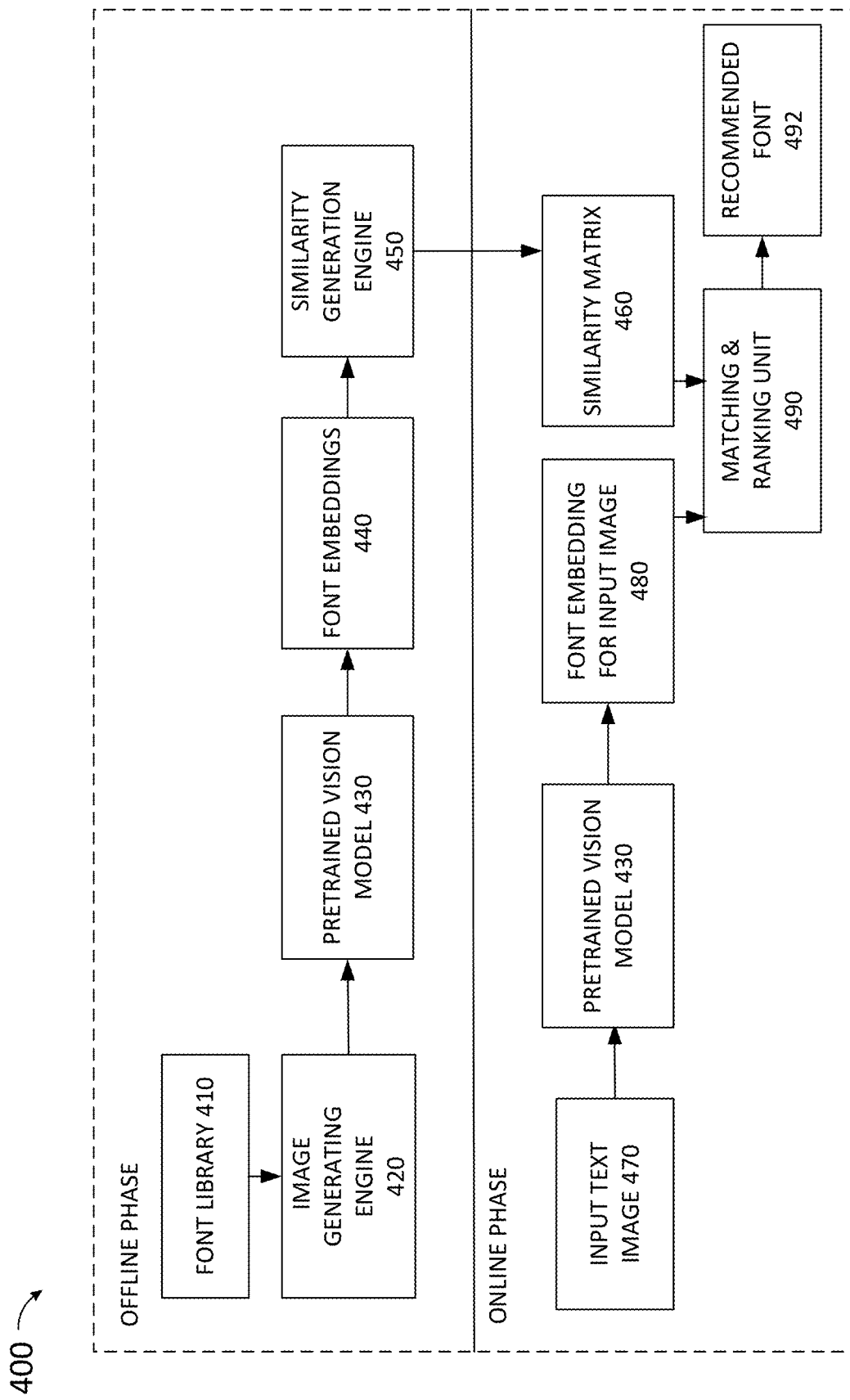
FIG. 4A depicts is an example model architecture for a font recommendation model that receives an image of a text segment as an input and provides one or more font recommendations for the text as an output.

FIG. 4A depicts is an example model architecture 400 for a font recommendation model that receives an image of a text segment as an input and provides one or more font recommendations for the text as an output. The model architecture 400 includes an offline phase and an online phase. The offline phase involves providing a given font library 410 to an image generation engine 420. The font library may be generated from a variety of fonts offered by various applications such that the resulting font model can recognize and offer recommendations for fonts used by different applications. As such, the font library includes fonts offered by many different applications. In some implementations, the library is generated by first collecting fonts offered by various applications and enterprises. The resulting collection includes fonts from a variety of font families. Each font family has variants such as regular, bold, condensed, italic, and the like. Because the differences between the fonts in each family are minor (e.g., features such as glyphs, height, width, etc. of the characters do not change much among the variants within a font family), in an example, only one or more representative fonts are selected from each font family for inclusion in the font library. The selection may be made based on a preference order of the variants present in that family. In some implementations, the order of preference is regular, book, medium, demi, light, bold, black, condensed, narrow, wide, and italic, such that regular font is given the highest preference. In this manner, the font library 410 is generated to include a collection of fonts used by many different applications. The fonts in the font library are in a format that is commonly used for fonts. In an example, the format is the TrueType Font format.

In order to use the fonts in the font library 410 for training the model, the fonts are converted from the font format to images. This is achieved by utilizing an image generating engine 420. The image generating engine is a system that can generate images using the TrueType Font format files along with some text inserted into the images. In an example, the tool used to generate the images is ImageMagick. A representative text is selected for generating the images of various fonts. In an example, the representative text is the phrase "Handgloves" because it covers a large number of glyphs (stokes). In some implementations, the image generating engine 420 then creates an image for each font in the font library by generating an image having a white background and the representative text written in black in one of the representative fonts.

Figure 4B:
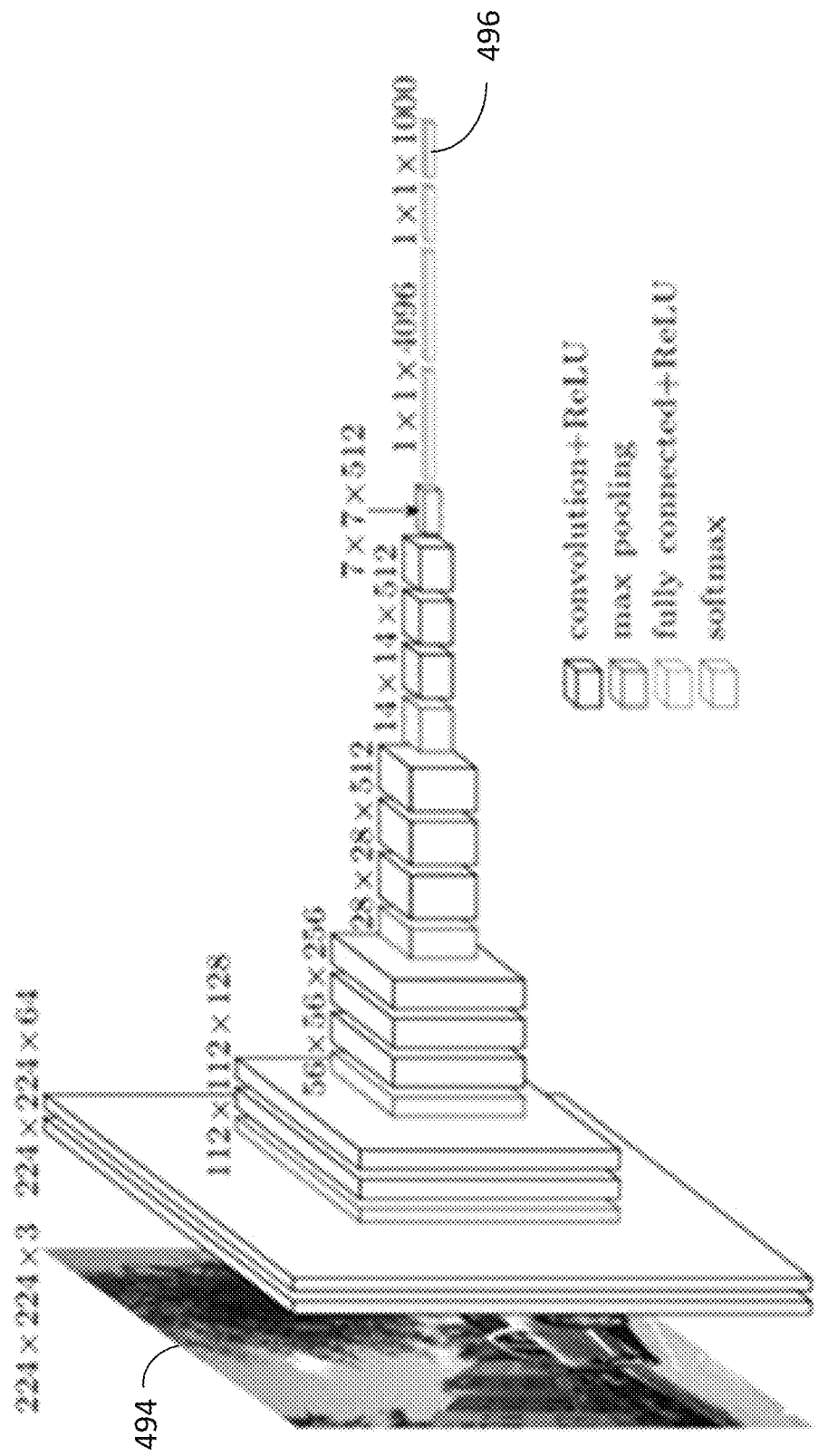
FIG. 4B depicts an example architectural diagram for a pretrained vision model for generating font embeddings.

Once the fonts in the font library 410 have been converted to images, the font images are provided as an input to a pretrained vision model 430 for feature extraction. The pretrained vision model 430 is a computer vision model that is trained to extract features from images. In an example, the pretrained vision model 430 is a VGG 16 model. The VGG 16 is a convolution neural network (CNN) model that can be used for object detection and classification. FIG. 4B depicts an example architectural diagram for a pretrained vision model. As depicted, the pretrained vision model can receive an image 494 as input and extract various features from the image via different layers such as a convolution and linear rectifier (ReLU) layer, max pooling layer, fully connected plus ReLU layer and a softmax layer to generate an output 496 via the softmax layer. Embeddings generated via the last fully connected layer of the pretrained vision model may be considered as features of the input fonts. As such, the pretrained vision model 430 processes the font images to generate the font embeddings 440. The font embeddings 440 contain features such as glyphs, height, width of the characters and their relationship with each other. In an example, each feature vector in the font embeddings 440 is a vector of 4069 dimensions.

The generated font embeddings 440 are provided to a similarity generation engine 450 to generate a similarity matrix 460 for the fonts. The similarity generation engine 450 calculates a cosine similarity for each font embedding against all the other font embeddings in the font embeddings 440. Each cell in the generated similarity matrix 460 has a similarity score between font 'i' and font 'j.' The similarity matrix 460 is then used in the online phase to identify fonts that are similar to an input font.

In an example, the offline phase occurs in multiple separate phases. For example, a font library is created in a first phase, before the font library is converted to images in a second phase. The generated images are then provided to the pretrained model to generate font embeddings in a third phase before the similarity matrix is generated in a separate phase.

The online phase includes receiving an input text image 470. As discussed above, the text image may be generated by parsing a larger image into different elements, some of which include text segments. An image is then created for a given text segment by cropping the larger image such that only the text segment is displayed in the input text image. The input text image 470 is provided to the pretrained vision model 430 to generate font embeddings 480 for the input image. The font embeddings 480 include features extracted from the input image. These features correspond to the font of the text in the input image 470. These features along with the similarity matrix 460 are provided to the matching and ranking unit 490. The matching and ranking unit 490 may then compare the font embedding 480 with the similarity matrix 460 to identify one or more fonts in the font library 410 that are similar to the font of the input image 470. For a given font, the matching and ranking unit 490 returns top 'n' similar fonts from the similarity matrix. When the font recommendation model is used as part of a document conversion service, the top recommended font is automatically selected as the recommended font for the input text.

Figure 5A:
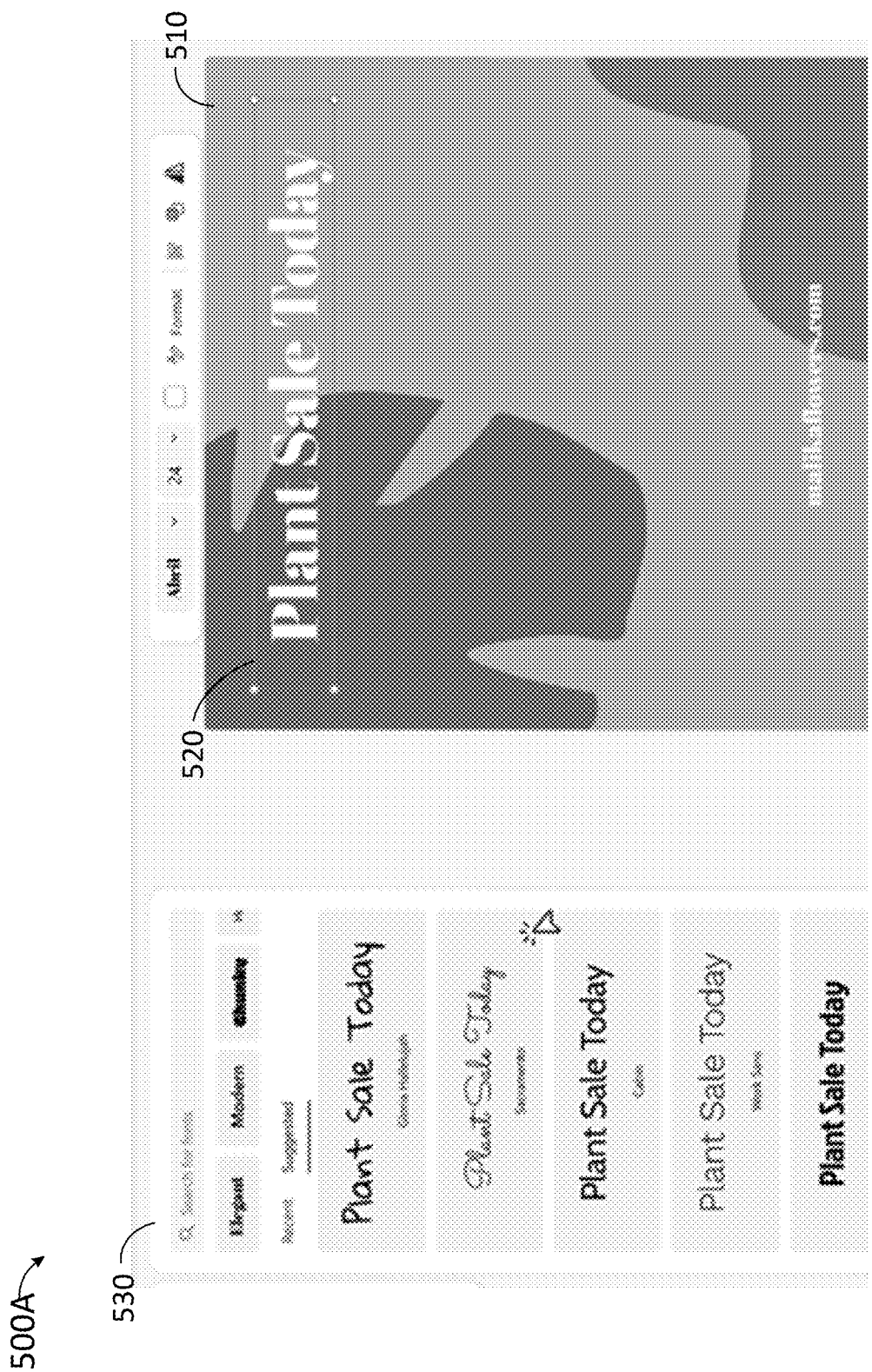
FIGS. 5A-5B depict graphical user interface (GUI) screens of an application or service that provides font recommendations.
Figure 5B:
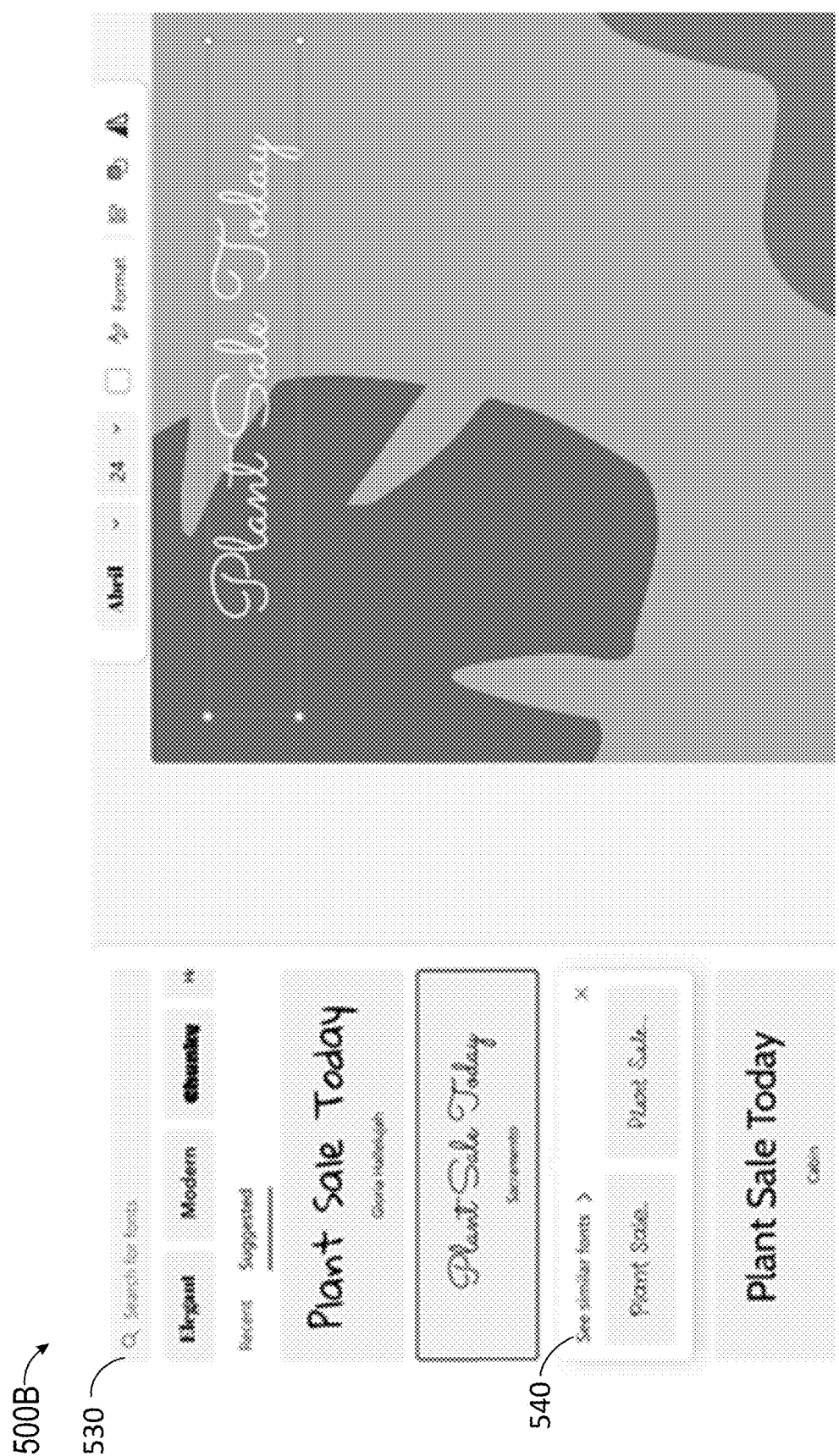

In addition to being used in conversion of non-editable documents to editable documents, the architecture 400 may also be used for font recommendation in other scenarios. For example, when the user selects a text segment in a given application, the font recommendation model may be used to recommend fonts to use for the text segment. This may be done by first converting the text segment to an image so that the image can be provided as an input to the font recommendation mode. FIGS. 5A-5B depict example GUI screens of an application or service that provides font recommendations. GUI screen 500A displays an example screen of a designer application for designing a document (e.g., a flier, card, presentation slide, marketing material, etc.). GUI screen 500 may include a content portion 510 for inserting, editing or viewing the content of a design. In an example, the content includes a textbox 520. When the user clicks on given textbox such as the textbox 520, a font pane 530 is displayed. The font pane 530 displays a list of suggested fonts. The suggested fonts are identified by utilizing the text segment displayed in the textbox 520 to identify similar font. The suggested fonts may be displayed based on ranking determined by the font recommendation model. In an example, the font pane displays the text selected text segment in each of the recommended fonts so that the user can easily view and compare the various fonts. In addition to recommending similar fonts, the font recommendation model can also categorize the available fonts in an application into multiple categories based on similarities and other features. For example, the fonts can be categorized into categories such as elegant, modern, chunky and the like. Selecting a font category results in display of the fonts in that category. In an example, the font categories displayed in the font pane 530 are those are determined to be associated with recommended fonts. As such, the font categories are also recommended font categories.

FIG. 5B displays a GUI screen 500B which depicts when a given font is selected in the font pane 530. Upon selection of a font, the GUI screen is changed to provide a menu option 540 for displaying similar fonts. Thus, each time a new font is selected, fonts that are similar to the selected font can be easily identified and presented to the user. Other features of a font recommendation menu may include enabling the user to view recently used fonts, which are displayed in the order of recency, and providing a search menu for searching for a font. The search menu may enable the user to search for fonts by name, vibe or mood, keyword, or classification.

Figure 6A:
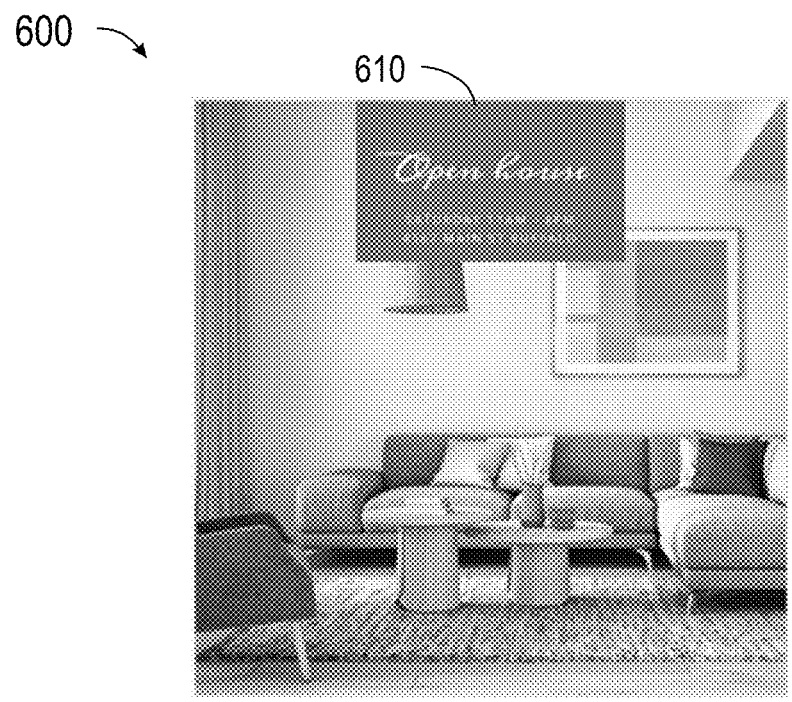
FIGS. 6A-6E depict examples of using style invariants to resize a document.

FIGS. 6A-6E depict examples of using style invariants to resize a document. FIG. 6A depicts an example document 600 that includes an element 610, as well as a variety of other elements. When a document such as document 600 is provided to a resizing algorithm such as the resizing engine 260 of FIG. 2, the algorithm first parses the document to create a list of elements. When the elements are identified, the algorithm creates a list of style invariants for the various elements. A style invariant refers to a set of two elements in the document and a positional relationship between the two elements. Depending on the number of elements in a document, the document can have multiple style invariants.

Figure 6B:
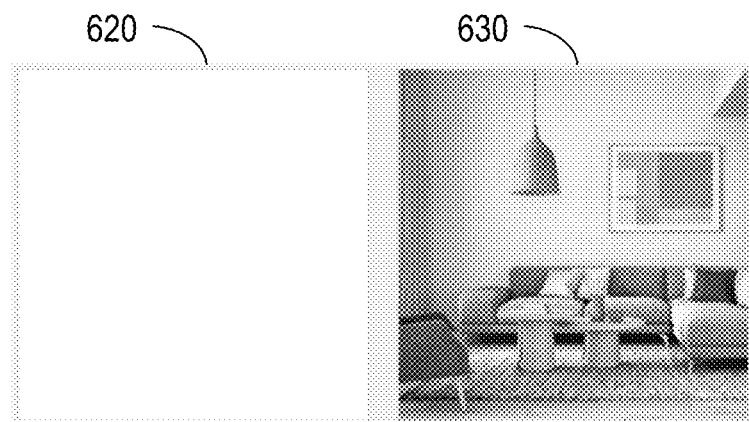
Figure 6C:
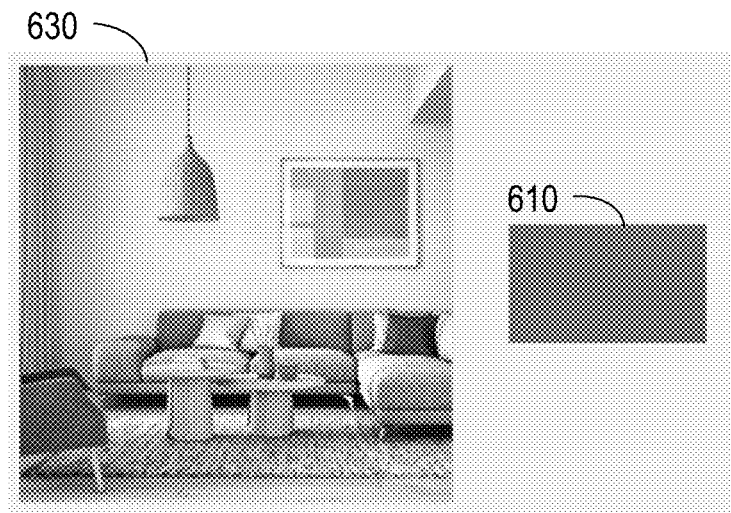
Figure 6D:
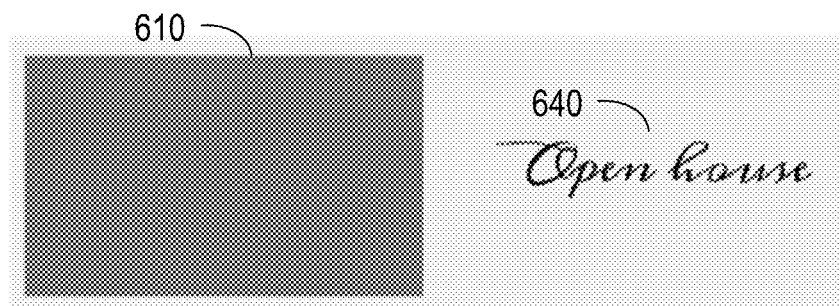
Figure 6E:

FIG. 6B displays the first style invariant in document 600. This style invariant is between the canvas 620 and the image 630. The relationship between these two elements is that the image 630 covers the entire area of the canvas. FIG. 6C displays another style invariant in the document 600. This style invariant relates to the relationship between element 610 (rectangular box that contains the text in the image) and the element 630 (image). The positional relationship between these elements is that element 610 is aligned with the top edge of element 630. FIG. 6D displays a third style invariant between elements of the document 600. This style invariant relates to the relationship between element 610 and the text element 640. The positional relationship between these elements is that element 640 is horizontally centered within element 610. FIG. 6E depicts another style invariants between elements of the document 600. This relates to the relationship between text element 640 and text element 650, where text element 650 is aligned with the bottom edge of element 640. Alternative style invariants may be identified and listed for a given document. For example, instead of the invariant depicted in FIG. 6E, an invariant consisting of element 610 and element 650 where element 650 is horizontally centered within element 610 may be identified. Furthermore, an element may have multiple invariant relationships with multiple elements. In some implementations, to ensure style invariants are correctly identified, the process of identifying style invariants involves a double loop taking every pair of elements in the template and checking for the best positional relationship between them.

Once the style invariants of a document have been identified, the document (e.g., canvas) is first resized to a desired aspect ratio without changing other elements in the document. Then, the algorithm places all elements that have an invariant relationship to the canvas in the document in accordance with the style invariant. Once the elements have been placed, then for each placed element, the algorithm places all other elements that have an invariant relationship to the placed element in accordance with their style invariant. This process is recursively performed until all elements have been placed. If the graph does not have cycles and every child has only one parent, this process is straightforward. For example, after resizing the canvas in document 600, the image is placed to cover the entire area of the canvas according to invariant 1. Then, element 610 is placed at the top edge of the newly aligned image according to invariant 2 and so on until all elements in the document have been placed. Once all the elements are placed, the images are cropped to their new bounding boxes. Next, check legibility is checked to prevent overlap. If an overlap exists, the text size of element size is changed to prevent overlap.

This provides a simple, lightweight and generic resizing algorithm which does not have rules specific to the type of shape or even to the type of dataset. Moreover, the algorithm does not require training and the same code can be used to resize a variety of documents such as word processing documents, presentation slides, research papers, web UI, and the like. Thus, while the resizing engine 260 of FIG. 2 is provided as part of a document conversion service, the resizing algorithm can be used to resize any document.

Figure 7:
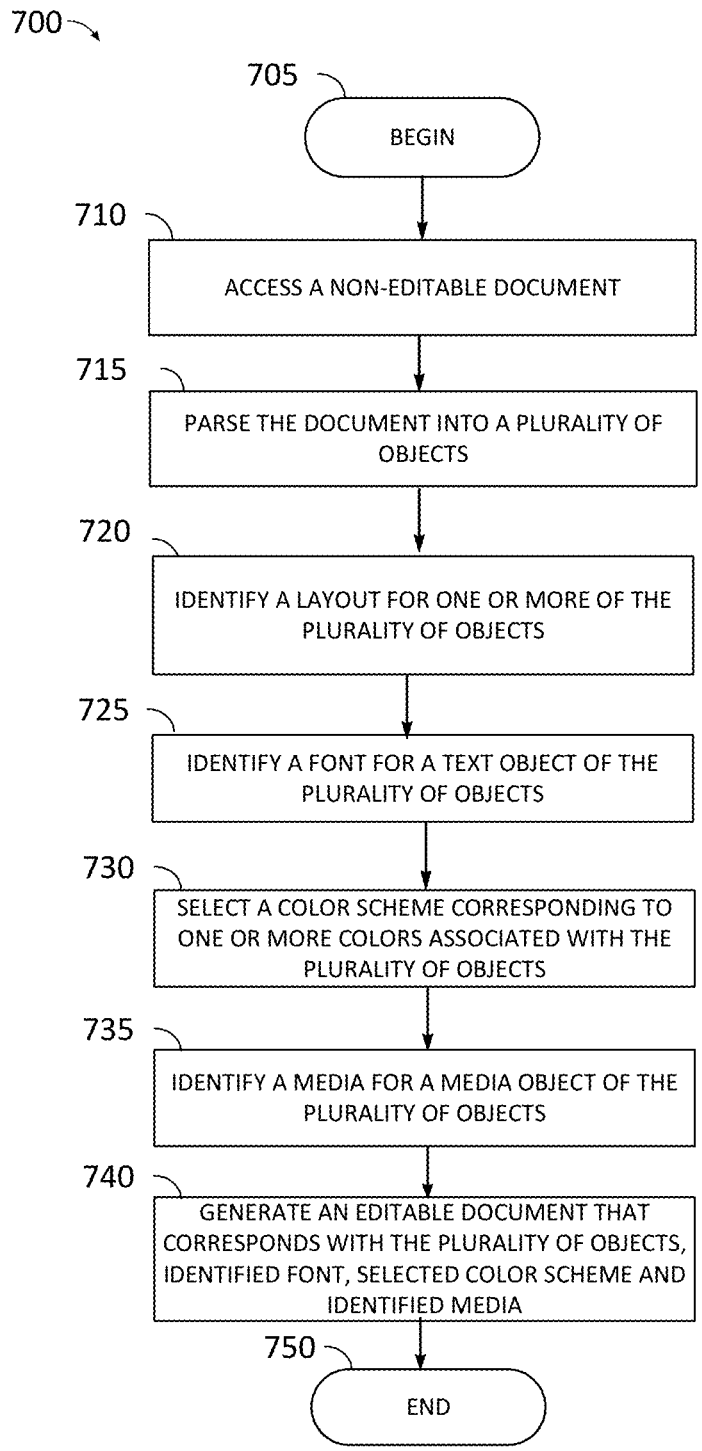
FIG. 7 is a flow diagram depicting an example method for generating an editable document from a non-editable document.

FIG. 7 is a flow diagram depicting an exemplary method 700 for generating an editable document from a non-editable document. One or more steps of the method 700 may be performed by a document conversion service such as the document conversion service 114 of FIGS. 1-2, by a local document conversion engine and/or by an application such as applications 112/134 of FIG. 1. The method 700 may begin, at 705, and proceed to access a non-editable document, at 710. This may occur, for example, when a user submits a request to convert a non-editable document via a UI of an application or service that provides document conversion services. The request may include a copy of the non-editable document and may be provided via a client device. The non-editable document may be a non-editable image, and the user may be interested in generating a similar image for a design.

Once the non-editable document is accessed, the document is parsed into a plurality of objects, at 715. The objects may include text objects (e.g., textboxes), media objects (e.g., images, icons, illustrations, etc.) and formatting objects such as a canvas. After the document is parsed into the objects that make up the document, the layout of one or more of the plurality of objects is identified, at 720. Identifying the layout involves detecting image and text bounding boxes for the plurality of parsed objects. This may be achieved by utilizing an object detection neural network model that receives the non-editable document as an input and provides coordinates of the bounding boxes as an output.

In some implementations, a determination is made as to whether one or more of the plurality of objects include text. This may involve the use of an OCR or an object recognition model. When it is determined that the plurality of objects includes a text object, method 700 proceed to identify a font for the text object, at 725. This is achieved by generating a font image for the text object, which is provided as an input to a font recommendation model and receiving as an output of the font recommendation model, an identified font for the text object. In addition to identifying fonts for text objects, method 700 also selects a color scheme for one or more objects of the plurality of objects, where the color scheme corresponds with one or more colors associated with the plurality of objects in the non-editable images, at 730. This involves calculating color pixel values for the various objects and identifying corresponding colors in an available color palette.

When the plurality of objects include a media object, method 700 may also identify a media for the identified media object, at 735. This is achieved by generating in image for each media object in the plurality of media objects and providing the media object to a media recommendation model for identifying usable media objects correspond with the media object of the non-editable document. The identified and recommended parameters is then used to generate an editable document, at 740. The editable document is generated such that it includes objects similar to the plurality of objects, the objects having the identified font, selected color scheme and identified media. The objects are placed in the generated document in accordance with coordinates of the bounding boxes identified for the non-editable document as they relate to the canvas object. The generated document may then be returned to the user for use. Once the editable document is generated and/or provided to the user, method 700 ends at 750.

Figure 8:
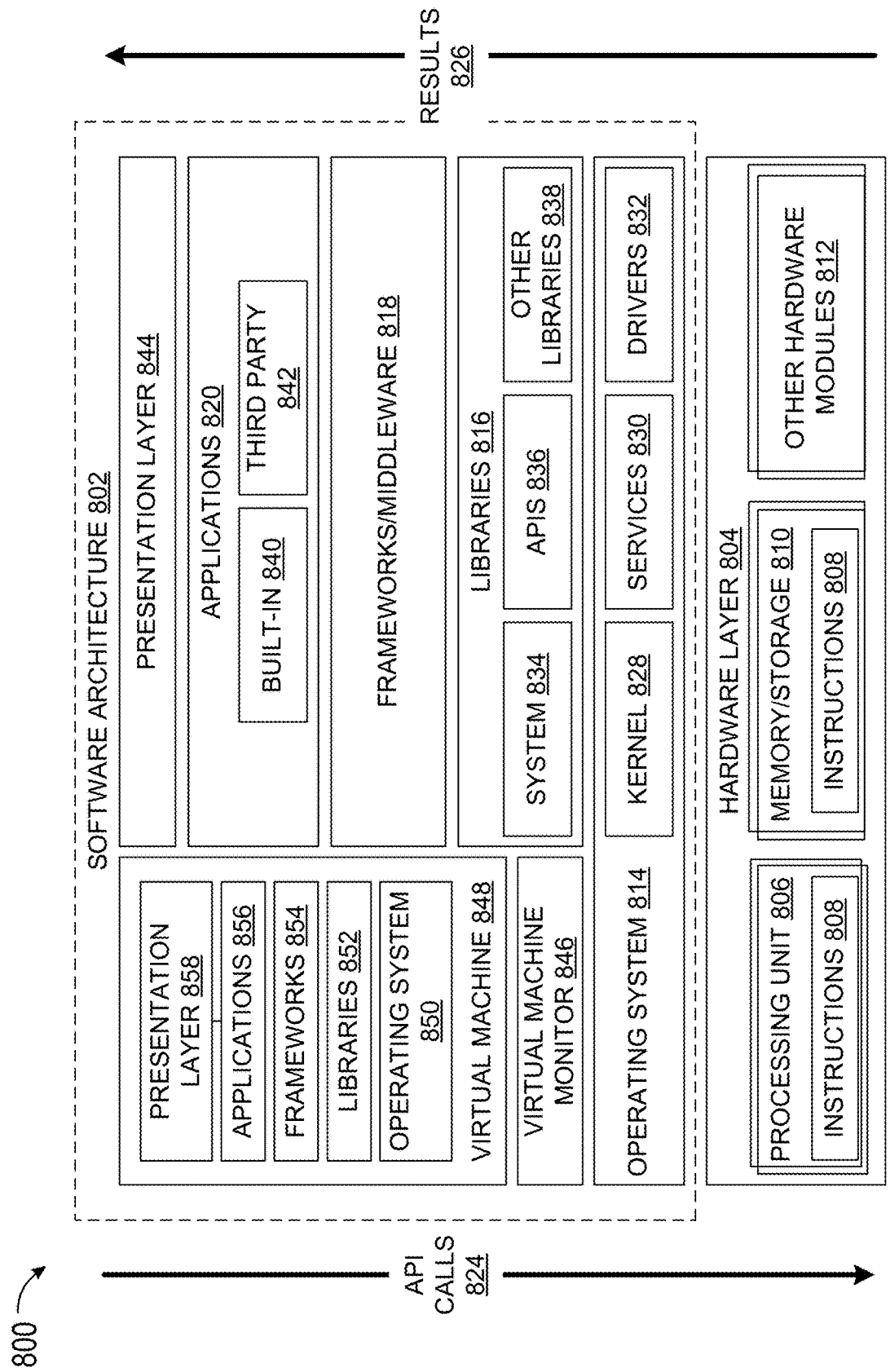
FIG. 8 is a block diagram illustrating an example software architecture, various portions of which may be used in conjunction with various hardware architectures herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as client devices, native application provider, web servers, server clusters, external services, and other servers. A representative hardware layer 804 includes a processing unit 806 and associated executable instructions 808. The executable instructions 808 represent executable instructions of the software architecture 802, including implementation of the methods, modules and so forth described herein.

The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular system. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine depicted in block diagram 900 of FIG. 9, for example). The virtual machine 848 may be hosted by a host OS (for example, OS 714) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
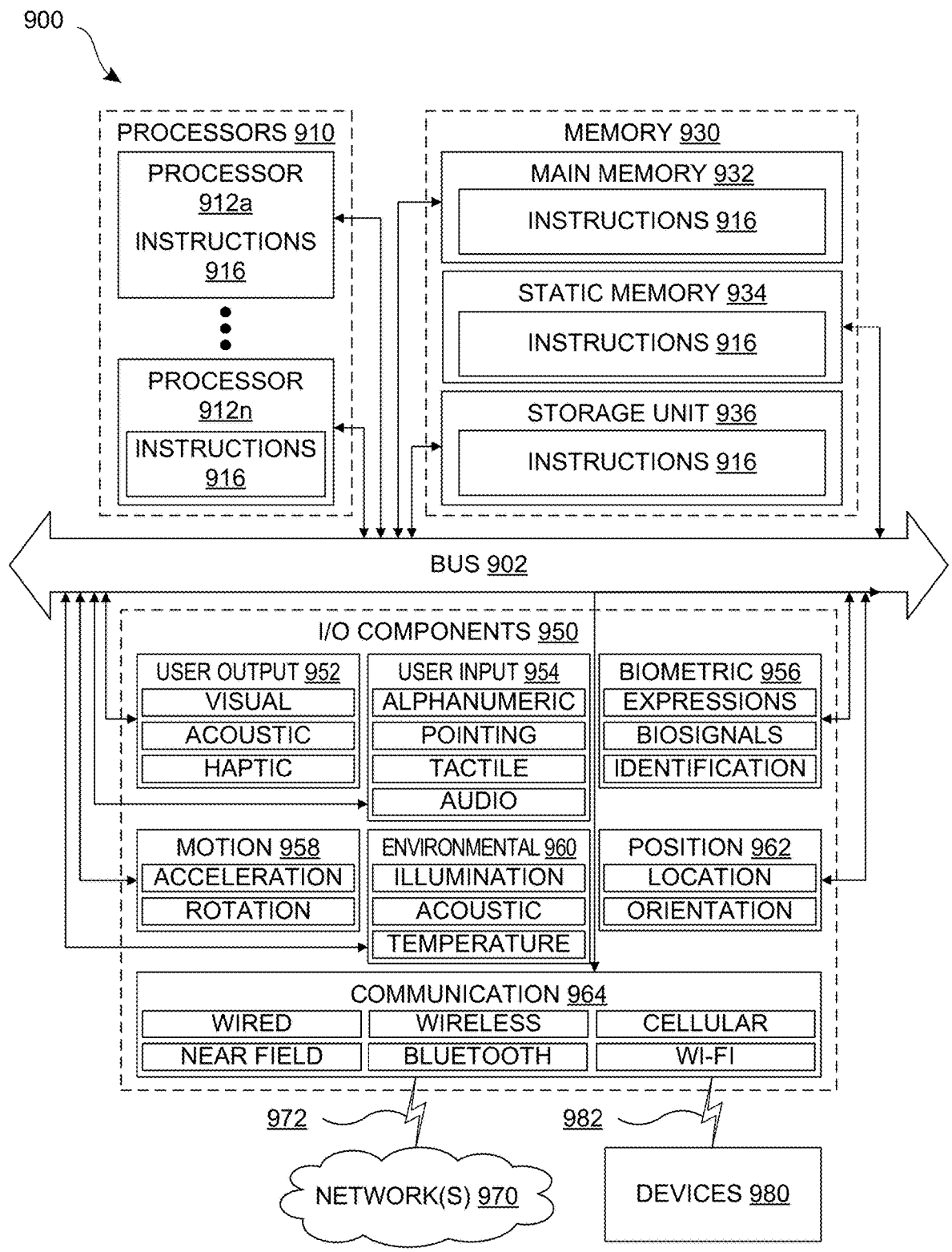
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement methods or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960 and/or position components 962, among a wide array of other environmental sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 962 may include, for example, location sensors (for example, a Global Position System (GPS) receiver), altitude sensors (for example, an air pressure sensor from which altitude may be derived), and/or orientation sensors (for example, magnetometers). The motion components 958 may include, for example, motion sensors such as acceleration and rotation sensors. The environmental components 960 may include, for example, illumination sensors, acoustic sensors and/or temperature sensors.

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-9) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
accessing a non-editable document, the non-editable document including a plurality of objects;
automatically identifying a layout for one or more of the plurality of objects;
determining that the plurality of objects include a text object via a machine-learning model;
upon determining that the plurality of objects includes a text object, identifying a font for the text object;
selecting a color scheme for one or more of the plurality of objects, the color scheme corresponding to one or more color values associated with the plurality of objects; and
automatically generating an editable document in accordance with at least one of the identified layout, identified font and selected color scheme.

Item 2. The data processing system of item 1, wherein identifying the layout for the one or more of the plurality of objects includes detecting bounding boxes for the one or more of the plurality of objects.

Item 3. The data processing system of item 2, wherein the bounding boxes are detected by an object detection machine-learning model.

Item 4. The data processing system of item 3, wherein the plurality of objects include the text object, an image object, and a canvas object.

Item 5. The data processing system of item 4, wherein the editable document includes a plurality of editable objects, each editable object corresponding with one of the plurality of objects, and the editable document is generated in accordance with coordinates of the bounding boxes in relation to the canvas object.

Item 6. The data processing system of any preceding item, wherein identifying the font includes:
generating an image of the text object;
providing the image to a trained font recommendation machine-learning model for identifying a suggested font that is similar to a font of a text segment in the text object;
receiving as an output of the machine-learning model the identified font.

Item 7. The data processing system of any preceding item, wherein selecting the color scheme for one or more of the plurality of objects includes:
determining one or more color values for at least one of the plurality of objects; and
selecting a color having a similar color value to the one or more color values from among available colors in a color palette.

Item 8. The data processing system of any preceding item, the color scheme includes at least one of a background canvas color, a background text object color, and a font color.

Item 9. The data processing system of any preceding item, wherein the executable instructions when executed by the processor, further cause the data processing system to perform functions of:
receiving a request to resize the editable document to a desired aspect ratio;
identifying a plurality of style invariants between each two objects of the plurality of objects in the editable document, the style invariant identifying a positional relationship between each two objects;
resizing the canvas to the desired aspect ratio;
placing each object of the plurality of objects in the resized canvas in accordance with an associated style invariant;
cropping image objects to their bounding boxes; and
correcting overlaps.

Item 10. A method for generating an editable document from a non-editable document comprising:
receiving the non-editable document via a network, the non-editable document including a plurality of objects;
automatically identifying a layout for one or more of the plurality of objects;
determining that the plurality of objects include a text object via a machine-learning model;
upon determining that the plurality of objects includes a text object, identifying a font for the text object;
determining that the plurality of objects include a media object;
upon determining that the plurality of objects include a media object, searching for and identifying a media object in a library of media objects, wherein the identified media object is similar to the media object; and
automatically generating an editable document in accordance with at least one of the identified layout, identified font and identified media object.

Item 11. The method of item 10, wherein generating the editable document includes:

creating an editable document, the editable document having a canvas; and inserting a plurality of editable-document objects that correspond with the plurality of objects of the non-editable document, the plurality of editable-document objects being laid out in accordance with the identified layout.

Item 12. The method of items 10 or 11, further comprising:

determining if the non-editable document includes text;

applying an optical character recognition model to the non-editable document to recognize the text, wherein generating the editable document includes inserting the recognized text in a text object of the editable document and applying the identified font to the inserted text.

Item 13. The method of any of items 10-12, wherein identifying the layout for the one or more of the plurality of objects includes detecting bounding boxes for the one or more of the plurality of objects.

Item 14. The method of any of items 10-13, wherein the plurality of objects include the text object, an image object, and a canvas object.

Item 15. The method of any of items 10-14, wherein identifying the font includes:

generating an image of the text object;

providing the image to a trained font recommendation machine-learning model for identifying a suggested font that is similar to a font of a text segment in the text object;

receiving as an output of the machine-learning model the identified font.

Item 16. The method of any of items 10-15, further comprising:

receiving a request to resize the editable document to a desired aspect ratio;

identifying a plurality of style invariants between each two objects of the plurality of objects in the editable document, the style invariant identifying a positional relationship between each two objects;

resizing the canvas to the desired aspect ratio;

placing each object of the plurality of objects in the resized canvas in accordance with an associated style invariant;

cropping image objects to their bounding boxes; and correcting overlaps between objects.

Item 17. A non-transitory computer readable medium on which are stored instructions that, when executed, cause a programmable device to perform functions of:

receiving a non-editable document via a network, the non-editable document including a plurality of objects;

automatically identifying a layout for one or more of the plurality of objects;

determining that the plurality of objects include a text object via a machine-learning model;

upon determining that the plurality of objects includes a text object, identifying a font for the text object;

selecting a color scheme for one or more of the plurality of objects, the color scheme corresponding to one or more color values associated with the plurality of objects; and automatically generating an editable document in accordance with at least one of the identified layout, identified font and selected color scheme.

Item 18. The non-transitory computer readable medium of item 17, wherein the instructions when executed, cause a programmable device to perform functions of:

determining that the plurality of objects include a media object;

upon determining that the plurality of objects include a media object, searching for and identifying a media object in a library of media objects, wherein the identified media object is similar to the media object; and including the identified media object in the editable document.

Item 19. The non-transitory computer readable medium of items 17 or 18, wherein generating the editable document includes:

creating an editable document, the editable document having a canvas; and inserting a plurality of editable-document objects that correspond with the plurality of objects of the non-editable document, the plurality of editable-document objects being laid out in accordance with the identified layout.

Item 20. The non-transitory computer readable medium of any of items 17-19, wherein identifying the font includes:

generating an image of the text object;

providing the image to a trained font recommendation machine-learning model for identifying a suggested font that is similar to a font of a text segment in the text object;

receiving as an output of the machine-learning model the identified font.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor, cause the data processing system to perform functions of:
      accessing a non-editable document, the non-editable document including a plurality of objects;
      automatically identifying a layout for one or more of the plurality of objects;
      determining that the plurality of objects include a text object via a machine-learning model;
      upon determining that the plurality of objects includes the text object, identifying a font for the text object via a trained font recommendation machine-learning model having an offline phase and an online phase;
      selecting a color scheme for one or more of the plurality of objects, the color scheme corresponding to one or more color values associated with the plurality of objects;
      automatically generating an editable document in accordance with at least one of the identified layout, identified font and selected color scheme;
      receiving a request to resize the editable document to a desired aspect ratio;
      identifying a plurality of style invariants between each two objects of the plurality of objects in the editable document to provide an identified plurality of style invariants, each style invariant identifying a positional relationship between two objects;
      creating a list of style invariants for the plurality of objects based on the identified plurality of style invariants;
      resizing a canvas of the editable document to the desired aspect ratio;
      placing each object of the plurality of objects in the resized canvas in accordance with an associated style invariant from the list of style invariants;
      cropping image objects to their bounding boxes; and
      correcting overlaps by changing text size of the text object to prevent the overlaps of the text objects placed in the resized canvas;
   wherein the offline phase of the trained font recommendation machine-learning model comprises a font library, an image generating engine to generate images of fonts in the font library, a pretrained vision model to produce font embeddings from the images of fonts and a similarity generation engine to generate a similarity matrix from the font embeddings; and
   wherein the online phase of the trained font recommendation machine-learning model comprises the pretrained vision model to receive an input text image of the text object and output a font embedding for the input text image, and a matching unit to output the font for the text object based on the similarity matrix and the font embedding for the input text image.

2. The data processing system of claim 1, wherein identifying the layout for the one or more of the plurality of objects includes detecting bounding boxes for the one or more of the plurality of objects.

3. The data processing system of claim 2, wherein the bounding boxes are detected by an object detection machine-learning model.

4. The data processing system of claim 3, wherein the plurality of objects include the text object, an image object, and a canvas object.

5. The data processing system of claim 4, wherein the editable document includes a plurality of editable objects, each editable object corresponding with one of the plurality of objects, and the editable document is generated in accordance with coordinates of the bounding boxes in relation to the canvas object.

6. The data processing system of claim 1, wherein identifying the font includes:
   generating an image of the text object;
   providing the image to a trained font recommendation machine-learning model for identifying a suggested font that is similar to a font of a text segment in the text object; and
   receiving as an output of the machine-learning model the identified font.

7. The data processing system of claim 1, wherein selecting the color scheme for one or more of the plurality of objects includes:
   determining one or more color values for at least one of the plurality of objects; and
   selecting a color having a similar color value to the one or more color values from among available colors in a color palette.

8. The data processing system of claim 1, the color scheme includes at least one of a background canvas color, a background text object color, and a font color.

9. The data processing system of claim 1, wherein the trained font recommendation machine-learning model is trained by:

converting, via the image generating engine in the offline phase, a plurality of fonts in the font library from a font format to an image format to generate a plurality of font images;

providing the plurality of font images to the pretrained vision model, in the offline phase, that is trained for extracting features from images;

receiving embeddings generated via the pretrained vision model, in the offline phase, as font embeddings for the font images;

providing the font embeddings to the similarity generation engine, in the offline phase, to generate the similarity matrix for the plurality of fonts by receiving from the similarity generation engine a similarity metric for similarity of each font embedding against one or more font embeddings, and generating, based on the similarity metric for each of font embedding, the similarity matrix in the online phase for the plurality of fonts; and providing the similarity matrix and font embedding for the font images to the matching unit in the online phase to generate a suggested font.

10. A method for generating an editable document from a non-editable document comprising:

receiving the non-editable document via a network, the non-editable document including a plurality of objects;

automatically identifying a layout for one or more of the plurality of objects;

determining that the plurality of objects include a text object via a machine-learning model;

upon determining that the plurality of objects includes the text object, identifying a font for the text object via a trained font recommendation machine-learning model having an offline phase and an online phase;

determining that the plurality of objects include a media object;

upon determining that the plurality of objects include a media object, searching for and identifying a media object in a library of media objects, wherein the identified media object is similar to the media object;

automatically generating an editable document in accordance with at least one of the identified layout, identified font and identified media object;

receiving a request to resize the editable document to a desired aspect ratio;

identifying a plurality of style invariants between each two objects of the plurality of objects in the editable document to provide an identified plurality of style invariants, each style invariant identifying a positional relationship between two objects;

creating a list of style invariants for the plurality of objects based on the identified plurality of style invariants;

resizing a canvas of the editable document to the desired aspect ratio;

placing each object of the plurality of objects in the resized canvas in accordance with an associated style invariant from the list of style invariants;

cropping image objects to their bounding boxes; and correcting overlaps between objects by changing text size of the text object to prevent overlaps of the objects placed in the resized canvas;

wherein the offline phase of the trained font recommendation machine-learning model comprises a font library, an image generating engine to generate images of fonts in the font library, a pretrained vision model to produce font embeddings from the images of fonts and a similarity generation engine to generate a similarity matrix from the font embeddings; and wherein the online phase of the trained font recommendation machine-learning model comprises the pretrained vision model to receive an input text image of the text object and output a font embedding for the input text image, and a matching unit to output the font for the text object based on the similarity matrix and the font embedding for the input text image.

11. The method of claim 10, wherein generating the editable document includes:

creating an editable document, the editable document having a canvas; and inserting a plurality of editable-document objects that correspond with the plurality of objects of the non-editable document in the canvas, the plurality of editable-document objects being laid out in accordance with the identified layout.

12. The method of claim 10, further comprising:

determining if the non-editable document includes text; and applying an optical character recognition model to the non-editable document to recognize the text, wherein generating the editable document includes inserting the recognized text in a text object of the editable document and applying the identified font to the inserted text.

13. The method of claim 10, wherein identifying the layout for the one or more of the plurality of objects includes detecting bounding boxes for the one or more of the plurality of objects.

14. The method of claim 10, wherein the plurality of objects include the text object, an image object, and a canvas object.

15. The method of claim 10, wherein identifying the font includes:

generating an image of the text object;

providing the image to a trained font recommendation machine-learning model for identifying a suggested font that is similar to a font of a text segment in the text object; and receiving as an output of the machine-learning model the identified font.

16. A non-transitory computer readable medium on which are stored instructions that, when executed, cause a programmable device to perform functions of:

receiving a non-editable document via a network, the non-editable document including a plurality of objects;

automatically identifying a layout for one or more of the plurality of objects;

determining that the plurality of objects include a text object via a machine-learning model;

upon determining that the plurality of objects includes the text object, identifying a font for the text object via a trained font recommendation machine-learning model having an offline phase and an online phase;

selecting a color scheme for one or more of the plurality of objects, the color scheme corresponding to one or more color values associated with the plurality of objects;

automatically generating an editable document in accordance with at least one of the identified layout, identified font and selected color scheme;

receiving a request to resize the editable document to a desired aspect ratio;

identifying a plurality of style invariants between each two objects of the plurality of objects in the editable document to provide an identified plurality of style invariants, each style invariant identifying a positional relationship between two objects;
creating a list of style invariants for the plurality of objects based on the identified plurality of style invariants;
resizing a canvas of the editable document to the desired aspect ratio;
placing each object of the plurality of objects in the resized canvas in accordance with an associated style invariant from the list of style invariants;
cropping image objects to their bounding boxes; and
correcting overlaps by changing text size of the text object to prevent overlaps of the objects placed in the resized canvas;
wherein the offline phase of the trained font recommendation machine-learning model comprises a font library, an image generating engine to generate images of fonts in the font library, a pretrained vision model to produce font embeddings from the images of fonts and a similarity generation engine to generate a similarity matrix from the font embeddings; and
wherein the online phase of the trained font recommendation machine-learning model comprises the pretrained vision model to receive an input text image of the text object and output a font embedding for the input text image, and a matching unit to output the font for the text object based on the similarity matrix and the font embedding for the input text image.

17. The non-transitory computer readable medium of claim 16, wherein the instructions when executed, cause a programmable device to perform functions of:
determining that the plurality of objects include a media object;
upon determining that the plurality of objects include a media object, searching for and identifying a media object in a library of media objects, wherein the identified media object is similar to the media object; and
including the identified media object in the editable document.

18. The non-transitory computer readable medium of claim 16, wherein generating the editable document includes:
creating an editable document, the editable document having a canvas; and
inserting a plurality of editable-document objects that correspond with the plurality of objects of the non-editable document in the canvas, the plurality of editable-document objects being laid out in accordance with the identified layout.

19. The non-transitory computer readable medium of claim 16, wherein identifying the font includes:
generating an image of the text object;
providing the image to a trained font recommendation machine-learning model for identifying a suggested font that is similar to a font of a text segment in the text object; and
receiving as an output of the machine-learning model the identified font.

\* \* \* \* \*